(12) United States Patent
Cowdery et al.

(10) Patent No.: US 6,869,535 B2
(45) Date of Patent: Mar. 22, 2005

(54) CO-OXIDATION METHOD AND CO-OXIDATION REAGENT FOR DECONTAMINATING GROUND WATER AND SOIL

(76) Inventors: Robert Collins Cowdery, 246 Forest Dr. North, Havana, FL (US) 32333; Joseph Linn Applegate, 3428 Clifden Dr., Tallahassee, FL (US) 32308; Kevin Michael Warner, 1538 Avondale Way, Tallahassee, FL (US) 32311

(*) Notice: Subject to any disclaimer, the term of this patent is extended or adjusted under 35 U.S.C. 154(b) by 108 days.

(21) Appl. No.: 10/159,406

(22) Filed: May 30, 2002

(65) Prior Publication Data
US 2002/0179530 A1 Dec. 5, 2002

Related U.S. Application Data
(60) Provisional application No. 60/294,360, filed on May 30, 2001.

(51) Int. Cl.$^7$ ............................................. B01D 11/00
(52) U.S. Cl. .................... 210/638; 134/25.1; 210/747; 210/758
(58) Field of Search ................. 210/638, 639, 210/747, 758, 774, 752; 134/25.1, 40; 166/266, 268, 270.1; 588/205

(56) References Cited

U.S. PATENT DOCUMENTS 5,700,107 A * 12/1997 Newton ...................... 588/205
6,474,908 B1 * 11/2002 Hoag et al. .................. 210/747

* cited by examiner

Primary Examiner—Joseph Drodge
(74) Attorney, Agent, or Firm—Robert M. Schwartz; Otto S. Kauder

(57) ABSTRACT

There is disclosed a co-oxidation method and a reagent system of co-oxidation agents for removing from a contaminated zone below the ground surface a water-immiscible organic compound having a density greater than that of water from a contaminated zone below the ground surface, comprising the steps of (a) injecting into the contaminated zone a solution of at least one inorganic permanganate salt, (b) injecting into the zone a cosolvent compatible with the inorganic permanganate salt, (c) causing reaction of the permanganate salt with the water-immiscible organic compound, and (d) extracting co-oxidant from the contaminated zone, thereby diminishing the level of water-immiscible organic compound present in the contaminated zone.

12 Claims, 5 Drawing Sheets

CO-OXIDATION METHOD AND CO-OXIDATION REAGENT FOR DECONTAMINATING GROUND WATER AND SOIL

CROSS-REFERENCE TO RELATED APPLICATION

This application claims the benefit of U.S. Provisional Patent Application Ser. No. 60/294,360, filed May 30, 2001, entitled CO-OXIDATION METHOD AND CO-OXIDATION REAGENT FOR DECONTAMINATING GROUND WATER AND SOIL.

BACKGROUND OF THE INVENTION

1. Field of the Invention

This invention relates to the decontamination of ground water and soil, in particular to the removal of such water-immiscible dense organic compounds as perchloroethene ($C_2Cl_4$, PCE), trichloroethene ($C_2HCl_3$, TCE), and dichloroethene (DCE).

2. Prior Art

It is known that potassium permanganate can oxidize PCE dissolved in groundwater and thus reduce its concentration. However, where non-aqueous phase dense organic compounds are present, ground water concentrations may rebound over time as equilibrium between aqueous and non-aqueous phases is reestablished.

There have also been trials of a cosolvent flushing method, in which PCE was removed from a source area containing dense non-aqueous phase liquid (DNAPL) PCE at a former dry cleaning facility as an extracted groundwater/alcohol/PCE ternary mixture, and approximately 70 percent of the mass of non-aqueous phase PCE was recovered from the test zone in four days. This method, while showing some promise, presents a formidable problem of disposal or recycling of the extracted ternary mixture.

SUMMARY OF THE INVENTION

It is accordingly an object of the invention to provide a co-oxidation method and a reagent system of co-oxidation agents for decontaminating ground water and soil that overcomes the above-mentioned disadvantages of the prior art methods and systems of this general type, in which rate of mass transfer from the non-aqueous phase to the aqueous phase is greatly increased while oxidation of the contaminant in the aqueous phase keeps the aqueous concentration low and maintains the driving force for transport of additional contaminant from the non-aqueous phase to the aqueous phase.

With the foregoing and other objects in view there is provided, in accordance with the invention, a method for removing from a contaminated zone below the ground surface a water-immiscible organic compound having a density greater than that of water, comprising the steps of (1) injecting into the contaminated zone a solution of at least one inorganic permanganate salt, (2) injecting into the zone a cosolvent compatible with the inorganic permanganate salt, (3) causing reaction of the permanganate salt with the water-immiscible organic compound, (4) extracting co-oxidant from the contaminated zone at a time beginning simultaneously with the injection of co-oxidant or subsequent thereto, thereby diminishing the level of water-immiscible organic compound present in the contaminated zone.

Extraction of co-oxidant can begin simultaneously with the start of injection are at any time thereafter.

Extraction of co-oxidant beginning during injection is termed dynamic Co-Oxidation and extraction of co-oxidant beginning some period of time after the injection occurs is termed static Co-Oxidation.

While the co-oxidant reagents can be added in any order, a preferred order of injection of the co-oxidant reagents is: permanganate solution first, followed by a pre-mixed solution of cosolvent and permanganate i.e. the essential ingredients of the co-oxidant reagent system of the invention.

With the foregoing and other objects in view there is also provided, in accordance with the invention, a novel homogeneous liquid co-oxidation reagent system comprised of water, an inorganic permanganate salt, and a cosolvent compatible with said permanganate salt.

A cosolvent compatible with a permanganate salt according to the invention is defined as a compound that is stable for at least 2 weeks at 70° F. in presence of an equal amount of water containing 5% by weight potassium permanganate. A suitable cosolvent can be at least one surfactant compatible with a permanganate salt, at least one water-soluble organic compound compatible with a permanganate salt, or a mixture of such surfactant and water-soluble organic compound.

Without intending to be bound by a theory, the inventors believe that the chemical reaction that takes place and removes water-immiscible organic compound contaminant from ground water and soil can be written for the case of PCE as the contaminant and potassium permanganate as the inorganic permanganate salt as follows:

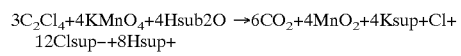

$$3C_2Cl_4 + 4KMnO_4 + 4H_2O \rightarrow 6CO_2 + 4MnO_2 + 4K^+ + Cl^- + 12Cl^- + 8H^+$$

Based on this stoichiometry, approximately 3 pounds of $KMnO_4$ is required to oxidize 1 pound of PCE. After reacting with the PCE (or other substances in the aquifer), the $KMnO_4$ is converted to potassium ion and manganese oxides, which typically are deposited as a fine brown precipitate.

The reaction as shown consumes PCE and permanganate salt. The co-oxidant surfactant and/or water-miscible organic compound does not participate in the reaction, and can be recovered for reuse in a subsequent operation. The reaction products are believed to be environmentally non-hazardous. The unreacted permanganate (excess oxidant) and the co-solvent are subject to environmental regulations governing the presence of chemical substances in groundwater, and may need to be extracted by pumping at the conclusion of remedial activities.

DESCRIPTION OF PREFERRED EMBODIMENTS

Figure 1:
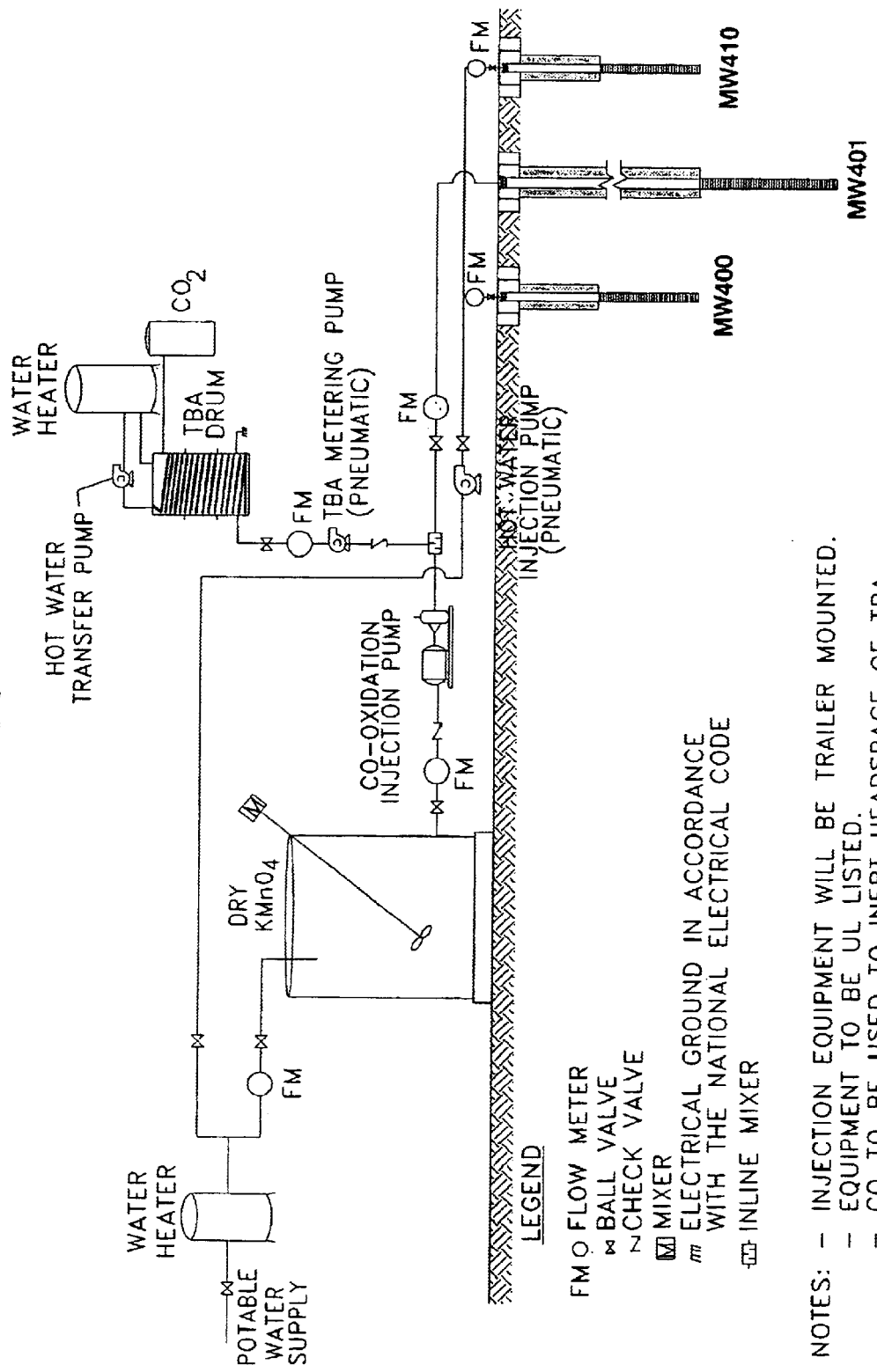
FIG. 1 is a schematic representation of above ground equipment for supplying permanganate solution, additional water, and co-oxidant to three injection wells reaching different below ground level depths.
Figure 2:
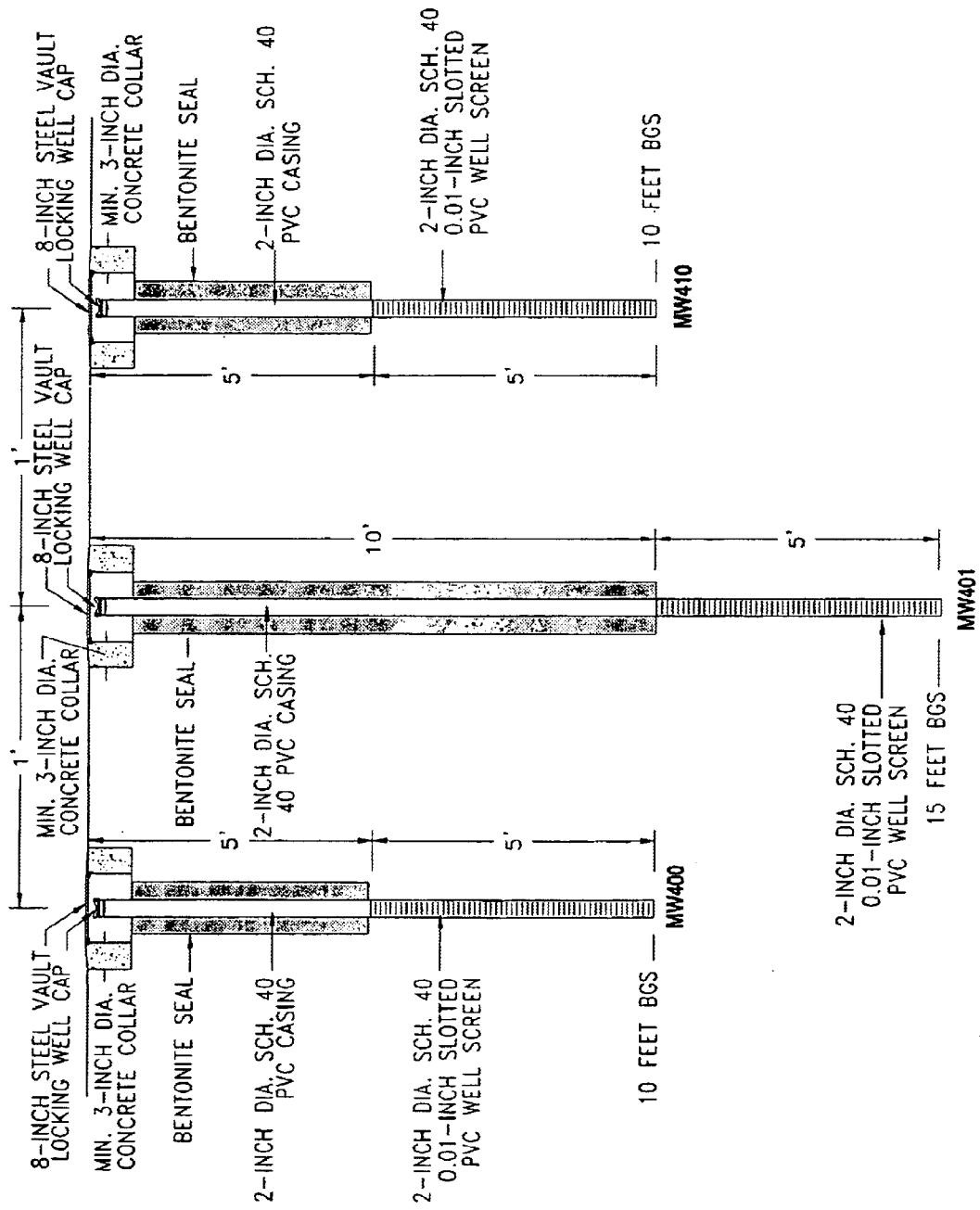
FIG. 2 is a vertical cross-section through the three injection wells in FIG. 1.
Figure 3:
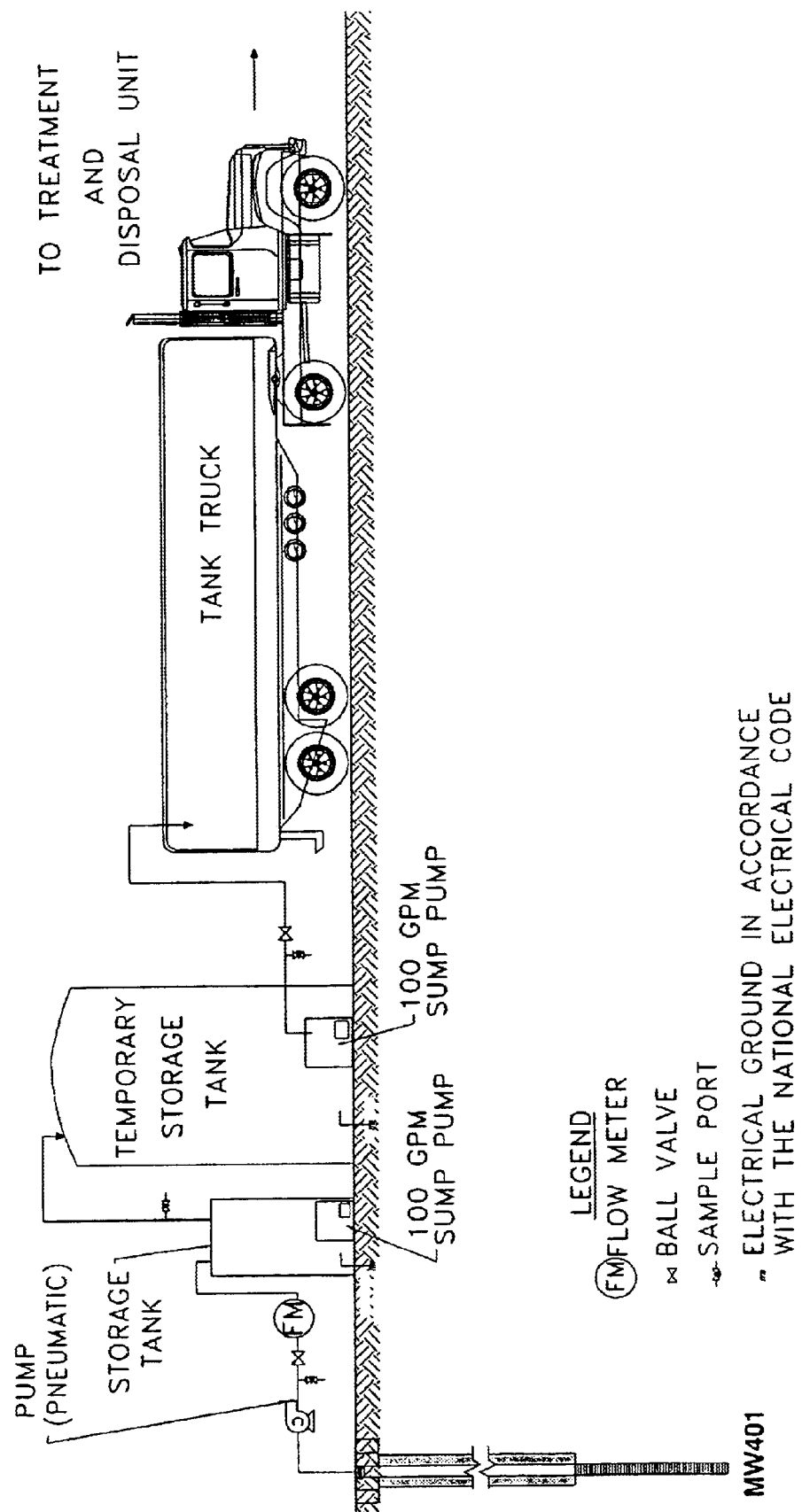
FIG. 3 is a schematic representation of an injection well with associated above ground equipment for recovering water and water-miscible organic compound for disposal or recycle after treatment of the contaminated zone.
Figure 4:
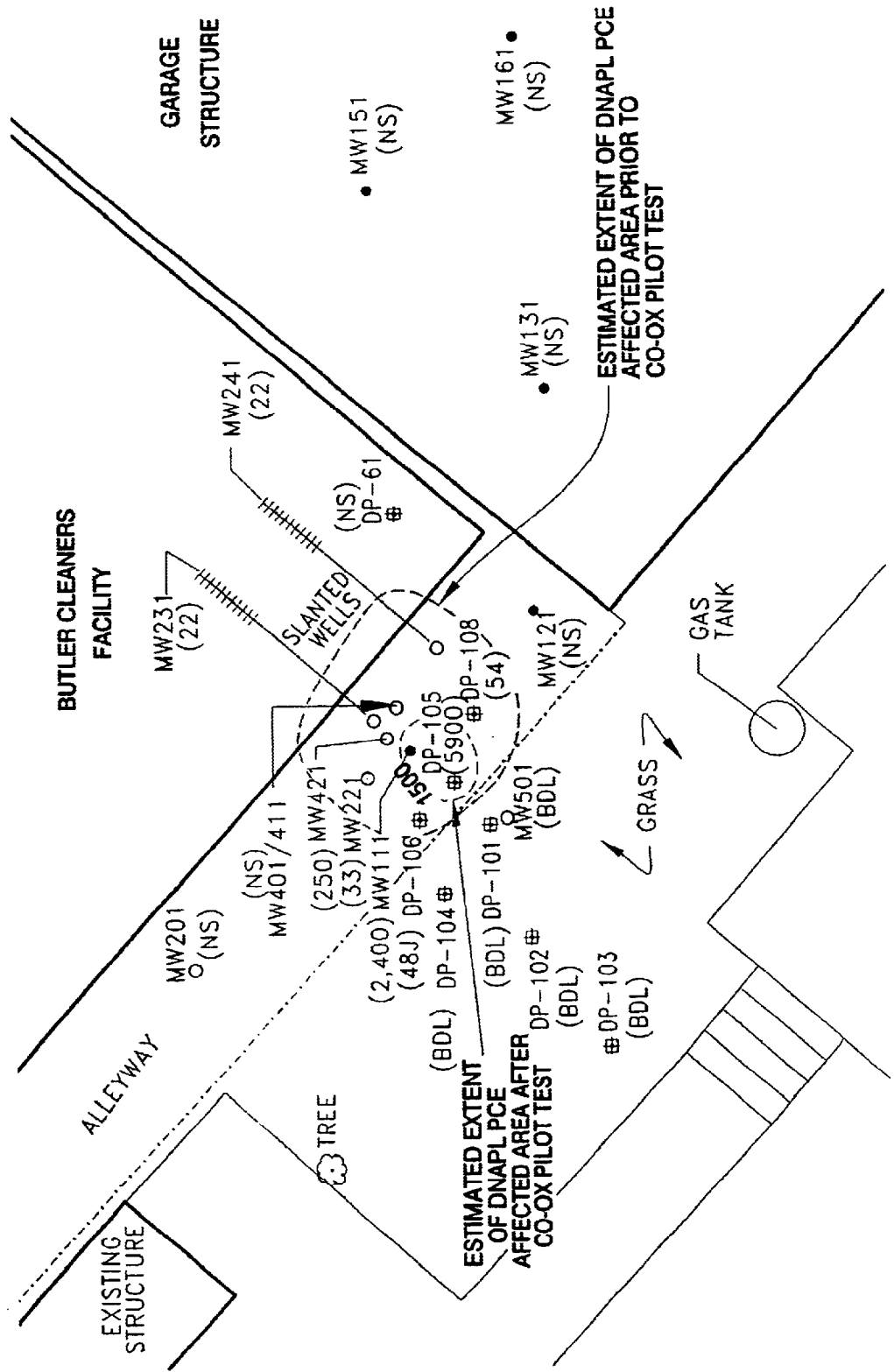
FIG. 4 is a map of a treatment site showing the location of injection wells and monitoring wells and the areas affected by DNAPL before and after treatment.
Figure 5:
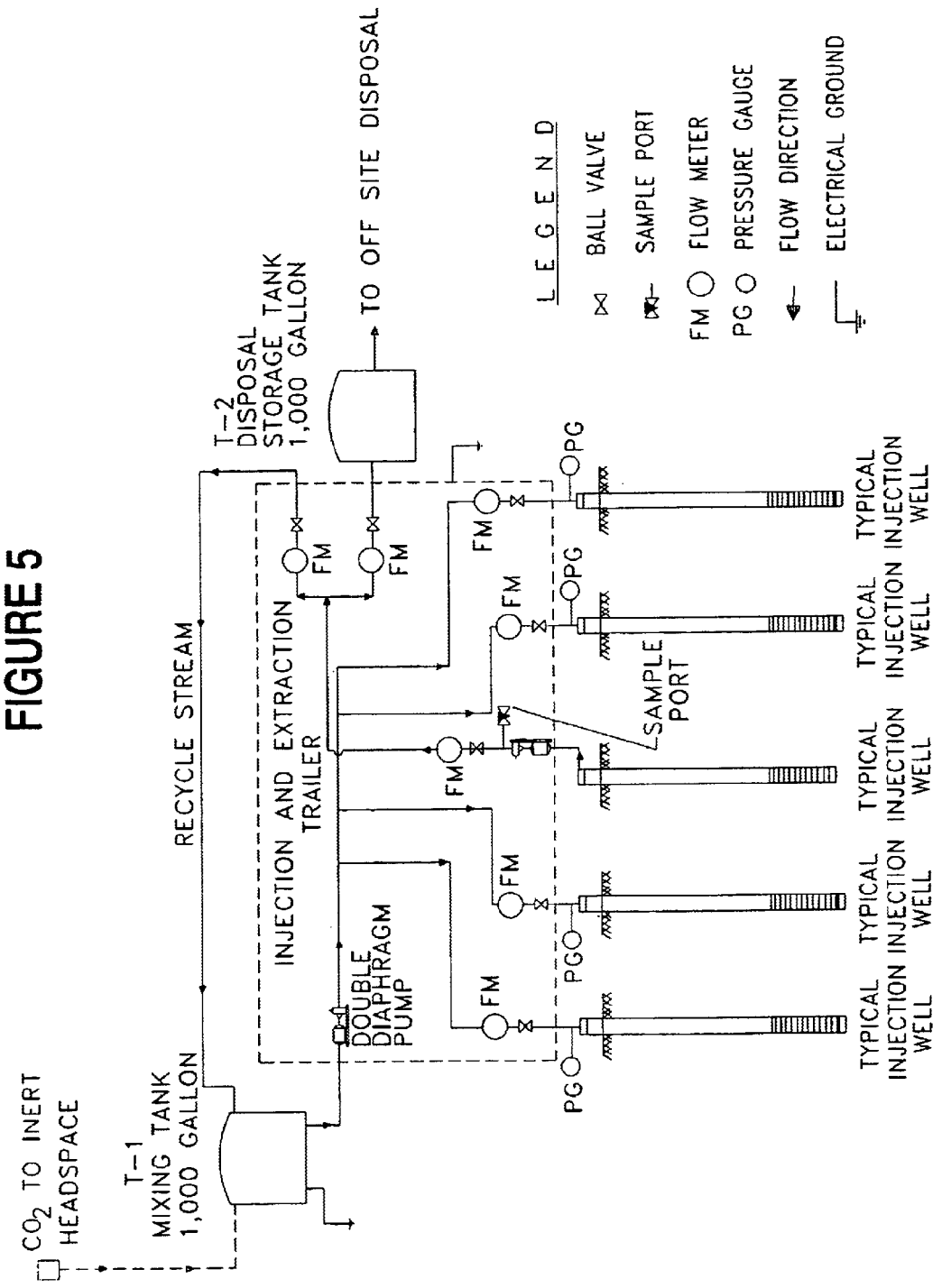
FIG. 5 is a process flow diagram showing an injection well surrounded by four extraction wells and associated above ground equipment.

Preferred water-immiscible organic compounds more dense than water removable from contaminated ground water and soil according to the invention include PCE, TCE, cis-1,2-dichloroethene, trans-1,2-dichloroethene, 1,1-dichloroethene and vinyl chloride.

The permanganate salts used according to the invention have solubility in water equal to or greater than that of potassium permanganate. Preferred inorganic permanganate salts used according to the invention include ammonium permanganate, calcium permanganate, magnesium permanganate, potassium permanganate, sodium permanganate, and strontium permanganate, and mixtures thereof.

Preferred co-oxidant surfactants compatible with inorganic permanganate salt can be amphoteric, anionic, cationic, or non-ionic.

Preferred co-solvent water-miscible organic compounds compatible with inorganic permanganate salt are non-acidic compounds of carbon, hydrogen, and oxygen with one to five carbon atoms and from one oxygen atom to as many oxygen atoms as carbon atoms, and include acetone, tertiary butyl alcohol, 1,2-dimethoxyethane, dimethoxymethane, 1,4-dioxane, and 1,3-dioxolane and mixtures thereof. Tertiary butyl alcohol is particularly preferred.

Preferred pre-mixed cooxidation reagent solutions contain 1–20% by weight inorganic permanganate salt, 15–50% by weight water-miscible organic compound co-solvent, and the balance water. A particularly preferred pre-mixed cooxidation reagent solution contains approximately 5% by weight potassium permanganate, 45% of tertiary butyl alcohol, and 50% water.

The method of the invention can be practiced at any convenient temperature between ambient (which can be close to the freezing point of water or seasonally warm) and an upper limit of approximately 120° F. mainly occasioned by considerations of safe handling by persons who might contact a liquid involved. Above ambient temperatures are particularly pertinent to maximize the effectiveness of potassium permanganate, whose solubility in water is approximately 35 grams per liter at 40° F. and 125 grams per liter at 100° F.

In a preferred embodiment, contact of the reagent solution of permanganate salt, water, and co-solvent is maintained and enhanced by injecting a layer of water, which can be pre-warmed and can also contain permanganate salt if desired.

This so-called "overflood" layer helps to prevent upward migration of the working solution, which as a result of the presence of dissolved organic compound can have a density lighter than water, upward and out of the contaminated zone being treated.

In a preferred embodiment, Co-Oxidation can be conducted in the dynamic mode. This includes injecting the co-oxidant reagents (with or without the overflood) in an injection well(s) and extracting fluids from nearby extraction well(s), which acts to pull the co-oxidant through the source area to the extraction well(s). Once breakthrough of the co-oxidant (or cosolvent) occurs at the extraction well(s), the fluid can be disposed of or recycled into the injection well. After completion of the co-oxidant injection, potable water may be injected in adjacent wells to increase the rate of co-oxidant (or cosolvent) recovery.

In a preferred embodiment, Co-Oxidation can be conducted in the static mode. This includes injecting the co-oxidant (with or without overflood) in an injection well(s) without extracting fluids from extraction well(s) and allowing a period of dwell time for the cooxidation reagent system to react with the contamination source. After this period of time the co-oxidant is extracted from the aquifer through the injection well(s). During extraction potable water can be injected in adjacent wells to increase the rate of co-oxidant removal.

EXAMPLE 1

A dry cleaning facility in Florida was selected for a test of the method of the invention. In this case the static co-oxidation process was selected. A PCE containing source area at the Site is located between 10 and 15 feet below the ground surface (bgs). The approximate areal extent of the source area is elliptical-shaped with a semi-major axis of approximately 15 feet and a semi-minor axis of approximately 7 feet The soil in this zone is comprised of fine sands with varying amounts of silt and clay. The depth to groundwater is approximately 5 feet. The site conditions at this facility are typical of conditions at many dry cleaning, industrial, and military facilities in Florida. This pilot test was conducted between May and October of 2001. The following are the conclusions of the pilot test:

The injection and extraction approach selected for this pilot test was the "Push_Pull" approach. Injecting the co-oxidant reagents with this approach was selected because we believed that it would prove to be more cost-effective and easier to implement in the limited area of the alleyway. Based on the data presented above, it appears that the "Push-Pull" approach did not achieve an efficient sweep of the source area. The southeast quadrant of the projected area of influence apparently did not receive a sufficient amount of co-oxidant solution. This could be due to lower hydraulic conductivity soil in this area and/or grout placed in the zone from past monitoring wells that were abandoned during the KMnO4 pilot test. The inefficiency of this approach could have been aggravated by the smaller diameter of the monitoring (injection) well and the installation method. In previous studies, the five-spot pattern (four injection wells surrounding one extraction well) has proven to be efficient. This approach should be used in future active remediation involving in situ flushing and Co_Ox.

Based on the data obtained before and after the Co-Ox pilot test, it appears that 80 to 90 percent of the source area in the 10 to 15-foot bgs zone in the alleyway has been remediated. Considering the inefficient injection approach used in the pilot test, it appears that the Co-Ox technology could be efficient at abating DNAPL PCE if used with an efficient delivery method. With a five-spot injection and extraction approach, a more efficient flow pattern would have been present in the southeastern quadrant of the projected area of influence. It is likely that this would have improved the removal of DNAPL PCE.

The mixing procedure selected for the Co-Ox solution was inefficient. Batch mixing of the solution may be more efficient. This could be conducted off site by a chemical supply company or on site using a batch tank process with appropriate storage capacity.

Heating the DNAPL PCE source zone was believed to be necessary to increase the solubility of the KMnO4 from about 60 g/l to approximately 120 g/l. While the heating of KMnO4 increases the solubility significantly, it complicates the mixing process in a field application. Using a Co-Ox process with sodium permanganate (NaMnO4) as the oxidizing agent or reducing the concentration of KMnO4 to appropriately 30 g/l may be more efficient. Sodium permanganate is available in a liquid solution that is easier to mix in the Co-Ox solution. The monitoring/injection wells and multilevel samplers were jetted into the aquifer. The jetting method was necessary due to the limited space in the alleyway, which precluded the use of conventional drilling equipment. Because of this installation procedure, providing a cement and/or bentonite seal around the well was difficult. Because smaller 1-inch diameter wells had to be used due to the space limitation, the injection pressure was significantly higher than what would be expected from large diameter injection wells. The smaller diameter wells have significantly less skin friction with the soil than larger diameter wells. The combination of higher injection pressures, the relatively low skin friction, and the ability of a grout seal to hold the well in place led to the failure of several wells during this pilot test and the KMnO4 pilot test. Future application of in situ injection and/or flushing technologies should be performed with wells of at least 2 inches in diameter when possible Property access from the property owner to the south of the Site has been obtained. This should provide access for a drill rig with the capacity to install 2 to 3-inch diameter wells.

Overflood wells were installed to minimize the vertical flow of the co-oxidant into the 5 to 10-foot bgs zone. This design component will be deleted from future use because of the problems experienced with this approach and the observation that the Co-Ox solution did not significantly flow vertically in the aquifer. With the five-spot injection and extraction pattern for in situ flushing processes, the overflood is not necessary.

TBA was removed during the Co-Ox extraction phase of the pilot test. Inventors believe that TBA is an appropriate cosolvent compound to use with the Co-ox process of the invention. TBA appears not to have rapid chemical reactions with KMnO4. The kinetics of these reactions appear to be relatively slow compared to the oxidation kinetics of KMnO4 and PCE.

The other UIC parameters discussed in the Co-Oxidation Pilot Test Plan (including chlorine, TDS, color, and pH) do not appear to be migrating off site. Analysis of the samples collected from the MW190 cluster indicates that none of the UIC parameters are above relevant standards.

EXAMPLE 2

After our evaluation of the pilot test results, we developed a design for a full-scale field demonstration of the Co-Oxidation technology at the Butler Cleaner facility in Jacksonville, Fla. This full-scale demonstration began in April of 2002 and is ongoing at the time of the submittal of this document. Because of the difficulties with the static mode as discussed above, this field demonstration is being conducted in the dynamic mode. Upon evaluating data from this demonstration, a full report will be made.

The Co-Oxidation process has several advantages over using either cosolvents or oxidants alone. With the addition of a cosolvent, the rate of mass transfer from the non-aqueous phase to the aqueous phase can be increased by orders of magnitude allowing rapid oxidation of the (now-dissolved) chlorinated solvent by the oxidant solution. This can result in a significant reduction in cleanup time. The advantages of co-oxidation over using cosolvents alone are listed below.

Oxidation of the aqueous solution of chlorinated solvent keeps the aqueous concentration low. This keeps the driving force term of the flux equation maximized, further reducing remediation time. The magnitude of the driving force is much more important in cosolvent-aided systems than in strictly aqueous systems, since the cosolvent greatly increases the magnitude of the mass transfer coefficient term in the flux equation.

Extracted fluid treatment costs can be significantly reduced and may be eliminated under appropriate site conditions, since the oxidant destroys the PCE once it has transferred to the aqueous phase.

The co-oxidant can be used in the static mode, which minimizes oversight, and operation costs, and allows operation of the project in locations with limited available space. Most of the equipment required is trailer-mounted and can be transported to the sites to be treated as necessary.

We claim:

1. A method for removing a water-immiscible organic compound having a density greater than that of water from a contaminated zone below the ground surface, comprising the steps of (a) injecting into the contaminated zone a solution of at least one inorganic permanganate salt, (b) injecting into the zone a cosolvent compatible with the inorganic permanganate salt, (c) causing reaction of the permanganate salt with the water-immiscible organic compound, and (d) extracting co-oxidant from the contaminated zone, thereby diminishing the level of water-immiscible organic compound present in the contaminated zone.

2. The method of claim 1, in which the water-immiscible organic compound comprises perchloroethylene.

3. The method of claim 1, in which the cosolvent comprises at least one surfactant.

4. The method of claim 1, in which the cosolvent comprises at least one water-soluble organic compound having one to five carbon atoms and from one oxygen atom to as many oxygen atoms as carbon atoms.

5. The method of claim 4, in which the cosolvent comprises t-butyl alcohol.

6. The method of claim 1, in which a reagent solution containing 1–20% by weight inorganic permanganate salt, 15–50% by weight water-miscible organic compound, and balance water is injected into the contaminated zone.

7. The method of claim 6, in which the permanganate salt is potassium permanganate.

8. The method of claim 6, in which the water-miscible organic compound is t-butyl alcohol.

9. The method of claim 1, in which a reagent solution is injected at a temperature in the range from 32° F. to 120° F.

10. The method of claim 1, in which an additional layer comprising water is injected into the zone.

11. The method of claim 1, in which injection into the zone and extraction of liquid from the zone are carried out simultaneously.

12. The method of claim 1, in which injection into the zone is followed by a period of dwell time before liquid is extracted from the zone.

* * * * *